United States Patent [19]
Tang et al.

[11] Patent Number: 5,960,173
[45] Date of Patent: Sep. 28, 1999

[54] SYSTEM AND METHOD ENABLING AWARENESS OF OTHERS WORKING ON SIMILAR TASKS IN A COMPUTER WORK ENVIRONMENT

[75] Inventors: John Tang, Palo Alto; Ellen Isaacs, Sunnyvale; Trevor Morris, Mountain View; Thomas Rodriguez, San Francisco; Alan Ruberg, Foster City; Rick Levenson, Mountain View, all of Calif.

[73] Assignee: Sun Microsystems, Inc., Mountain View, Calif.

[21] Appl. No.: 08/577,728

[22] Filed: Dec. 22, 1995

[51] Int. Cl.$^6$ .................................................. G06N 1/413
[52] U.S. Cl. .............................. 395/200.31; 395/200.35; 348/15
[58] Field of Search .................... 395/200.01, 200.03, 395/200.04, 200.12, 200.02, 680, 682, 683, 200.3, 200.31, 200.34, 200.35, 200.36, 200.37, 200.43, 200.57, 330, 331, 332; 340/825.49; 348/15; 345/329, 330, 331, 332

[56] References Cited

U.S. PATENT DOCUMENTS

| | | | |
|---|---|---|---|
| 4,974,173 | 11/1990 | Stefik et al. | 364/521 |
| 5,008,853 | 4/1991 | Bly et al. | 364/900 |
| 5,233,687 | 8/1993 | Henderson, Jr. et al. | 395/158 |
| 5,337,407 | 8/1994 | Bates et al. | 395/153 |
| 5,347,306 | 9/1994 | Nitta | 348/15 |
| 5,363,507 | 11/1994 | Nakayama et al. | 395/800 |
| 5,446,842 | 8/1995 | Schaeffer et al. | 395/200.01 |
| 5,627,978 | 5/1997 | Altom et al. | 395/330 |
| 5,634,129 | 5/1997 | Dickinson | 395/683 |
| 5,649,105 | 7/1997 | Aldred et al. | 395/200.04 |
| 5,819,084 | 10/1998 | Shapiro et al. | 395/610 |

OTHER PUBLICATIONS

Benford, S. and Fahlén, L, "Awareness, Focus and Aura A Spatial Model of Interaction in Virtual Worlds", Proceedings of the International Conference on Human–Computer Interaction, vol. 2, No. 8, pp. 694–698, Aug. 8, 1993.

Dewan, P and Choudhary, R., "Primitives for Programming Multi–User Interfaces", Proceedings of the 4$^{th}$ Annual Symposium on User Interface Software and Technology (UIST), pp. 69–78, Association for Computing Machinery, Nov., 1991.

Gutwin, C. and Greenberg, S., "Support for Group Awareness in Real–Time Desktop Conferences", Technical Report 95–575–27, Department of Computer Science, University of Calgary, Canada, pp. 1–12, Mar., 1995.

Curtis, Pavel and Nichols, David A., "MUDs Grow Up: Social Virtual Reality in the Real World", Third International Conference on Cyberspace, May 14–15, 1993, Austin, Texas.

Fitzpatrick, Geraldine, Tolone, William J. and Kaplan, Simon M., "Work, Locales and Distributed Social Worlds", Fourth European Conference on Computer–Supported Cooperative Work, Sep. 10–14, 1995, Urbana–Champaign, Illinois.

Bentley, Richard, Horstmann, Thilo, Sikkel, Klaas and Trevor, Jonathan, "Supporting Collaborative Information Sharing with the World Wide Web: The BSCW Shared Workspace System", Fourth International World Wide Web Conference, Dec., 1994, Boston, MA.

*Primary Examiner*—Thomas Peeso
*Attorney, Agent, or Firm*—Fenwick & West LLP

[57] ABSTRACT

A computer system and method provide networked computer users with information about which other users are task proximate to the user, thereby facilitating spontaneous communications regarding task-related, or other, issues. The information about other users is displayed in a user interface window on each computer that presents a visual representation of each user who is task proximate to the user operating the computer. Task proximity to other users may change as the user context switches between applications, and the user interface window is updated accordingly. Task proximity is determined individually by different applications. One exemplary system architecture for providing the information includes a person object representing each user, and storing the visual representation of the user. An encounter window on each computer displays the visual representations. A number of encounter-aware applications may execute on each computer. An encounter server on each computer provides communication between the encounter-aware applications of the positions of each user, position being determined, for example, by the function the user is using, the data, and the time.

52 Claims, 8 Drawing Sheets

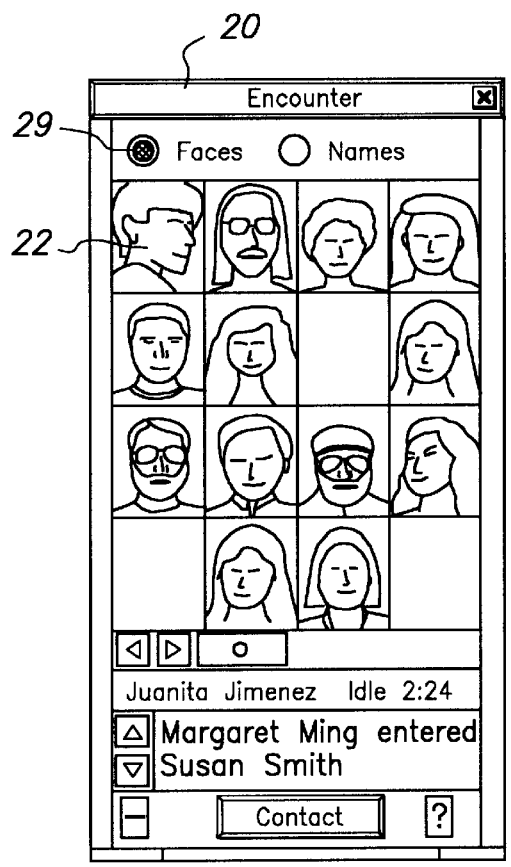
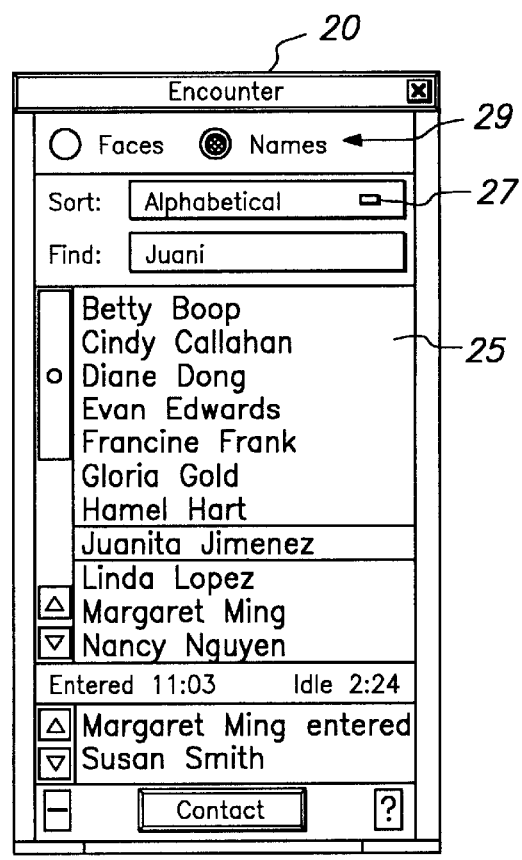
FIGURE 3  FIGURE 4

SYSTEM AND METHOD ENABLING AWARENESS OF OTHERS WORKING ON SIMILAR TASKS IN A COMPUTER WORK ENVIRONMENT

RELATED APPLICATION

This application is related to the application Ser. No. 08/582,165, filed on Jan. 2, 1996, entitled SYSTEM AND METHOD PROVIDING A COMPUTER USER INTERFACE ENABLING ACCESS TO DISTRIBUTED WORKGROUP MEMBERS, which is incorporated by reference herein. Both applications are assigned to Sun Microsystems, Inc. of Mountain View, Calif.

BACKGROUND

1. Field of the Invention

The present invention relates generally to the field of computer user interface design, and more particularly to user interfaces and methods for improved user collaboration in computer-based work environments.

2. Description of the Background Art

In many workplaces, a significant degree of workers' productivity is based on the ability to directly interact with other workers in order to exchange information about common problems, issues, or concerns. Informal interactions are extremely important for workers who are members of a team or a workgroup sharing various aspects of a common project. Recent research has shown that while informal interactions are responsible for a significant amount of information flow in an organization, they are under-utilized with respect to how effective they are. In particular, recent investigations of information flow in organizations have found that when people wanted to communicate information to others in the organization, they tended to communicate through the hierarchical management chain, using formal mechanisms, such as documents and presentations, even though they did not find these mechanism to be very effective. On the other hand, when workers wanted to find out information from other parts of the organization, they tended to ask other workers who they knew and respected, thus, relying on informal interactions, particularly personal, spoken communications. This research suggests that informal interactions often lead to an improved sense of community in the workplace and team cohesion, more efficient problem solving, and an increased pool of knowledge and experiences among workers. This collection of knowledge and experience improves the performance of individual workers and workgroups as a whole, and often improves morale and job satisfaction.

Physical proximity supports group work by enabling group members to enter informal, unplanned interactions. In particular, in working environments where group members share nearby offices and workspaces, there is often an awareness of which other group members are present. This enables one group member to easily contact the other group member present and initiate a dialogue with that person on some issue of concern. The awareness of others is known to be important for enabling spontaneous, and impromptu interactions that in turn facilitate workers in coordinating their actions, and creating shared understanding of common issues. The ability to informally interact in this manner provides significant benefits to the business, and the awareness workers have of other workers facilitates this ability to interact.

Group members often have many similar or overlapping tasks to perform, and common sources of information or data to use in working on various aspects of a common problem. Many of the informal interactions between group members are directed to solving common problems in these tasks. Encountering colleagues in the course of these activities often provides opportunities for informal yet effective interpersonal communication. The awareness of other workers further facilitates the sharing of issues related to common tasks or functions.

However, several trends are combining to make it hard for work groups to stay cohesive. As organizations get larger in size, members of work groups often get distributed among different buildings on a campus, or even to globally distributed geographical sites. Companies are also embracing flexible work schedules, telecommuting, and working-at-home programs. The escalating use of computers in the corporate workplace further influences these trends.

All of these trends combine to detract from the physical access that work groups traditionally shared by being in close physical proximity to each other. An increasing amount of group work is accomplished through electronically mediated mechanisms, such as networked computer systems, facsimiles, video teleconferencing and the like. While these electronic facilities can very efficiently aid the flow of raw information across physical distances that may separate group members, they do not provide the same rich sense of awareness and opportunities for interaction shared by people who work physically in the same location.

Accordingly, it is desirable to provide a computer-based mechanism that provides to distributed work group members an analogue of the sense of awareness shared by workers who are physically near each other. In a desirable collaborative computer system, applications should gracefully provide awareness of other people who are "task proximate." Workers are task proximate when they are working on the same or related data, with the same or related applications, at about the same time. A desirable mechanism further provides a way for people to initiate a conversation or other encounter with another person who is task proximate and with whom they would like to interact.

Computer implemented communication devices of many varieties are known, but they fail to provide a generalized mechanism that produces an awareness of other workers having similar tasks for any variety of tasks. Some conventional products provide very limited information targeted to a specific type of application. For example, a conventional web browser for accessing the World Wide Web (WWW) can only determine if two or more different users are on the same web page at the same time. Both users must have the same web browser application and the web page must be provided by a web server compatible with the web browsers. This limits the awareness of others to a very small and specific community of users and computing resources. Moreover, because the implementation is designed to determine only whether there is more than one user on the same web page, such a product fails to provide a generalized system architecture that can be used with various different applications to determine whether individuals are performing related tasks on related data in various time periods of use. Further, such products do not provide a generalized user interface that indicates the relationship between the tasks different workers are performing and that facilitates communication with them.

Other conventional products rely on geographic models to simulate shared environments of a community of users. Examples of these include Multi-user dungeons (MUDs) and MUDs, object-oriented (MOOs). These mechanisms provide a virtual space through which users navigate, interacting with other users sharing the same room or location in the virtual space. These mechanisms are based entirely on a location-oriented model of the virtual space, and not on a task-oriented model. Further, MOOs and MUDs are designed for use as their own environment, in a sense their own application, rather than an architecture with which other applications can operate and provide task proximity information. In addition, most MOOs and MUDs are used for entertainment purposes, and specifically to meet other users.

Other conventional computer tools merely provide directed communication facilities. For example, email or video-conferencing products allow a user to directly communicate with other workers in a particular mode. However, these products provide no information about the task proximity of users. Rather, these tools are intended for a user who already knows they want to communicate with a particular person or group of persons. Thus, they do not facilitate the type of spontaneous interactions enabled by an awareness of users who are task proximate to one another.

SUMMARY OF THE INVENTION

An embodiment of the present invention provides a mechanism that enables workers using their computers to know which other workers are "nearby" in terms of the type of work they are doing, such as the data they are accessing, the application they are using, and the time when such work was performed. In one embodiment, this relationship is known as "task proximity." One worker is "task proximate" to another worker when both are accessing similar types of data, or using similar application tools within a particular time period. The relationship between the data, tools, time period may be varied to accommodate different types of data and applications. The task proximity relationships correspond to the types of interactions fostered in physical working environments where workers share information on common tasks. The invention informs workers of the others who are task proximate, facilitating the type of spontaneous interactions found in physical working environments, since a worker who is working on a computer-implemented task might benefit from the awareness that other workers are working on similar tasks. When a worker is aware of other users in this manner, there is an increased likelihood of an interaction that will support their tasks or some other related task.

Workers will typically be using a number of different computer applications to perform their job functions and goals. While different workers may be using different applications, they may nonetheless be performing the same or similar tasks. Accordingly, another aspect of the present invention provides a system and application architecture for determining task proximity between different users, operating on different machines, using different applications at different times. In addition, because the ultimate goal is to facilitate interactions between task proximate users, the architecture of the present invention provides mechanisms for efficient and simple initiation of communications between task proximate users. Finally, the present invention provides a user interface with representations of task proximate workers, enabling each worker to easily initiate various types of interactions with other workers.

BRIEF DESCRIPTION OF THE DRAWINGS

FIG. 3 is an illustration of the encounter window in open mode format.

FIG. 4 is an illustration of another embodiment of the encounter window providing search and sort mechanisms in the open mode, extended format.

DETAILED DESCRIPTION OF THE INVENTION

The Encounter Window and Task Proximity

Figure 1:
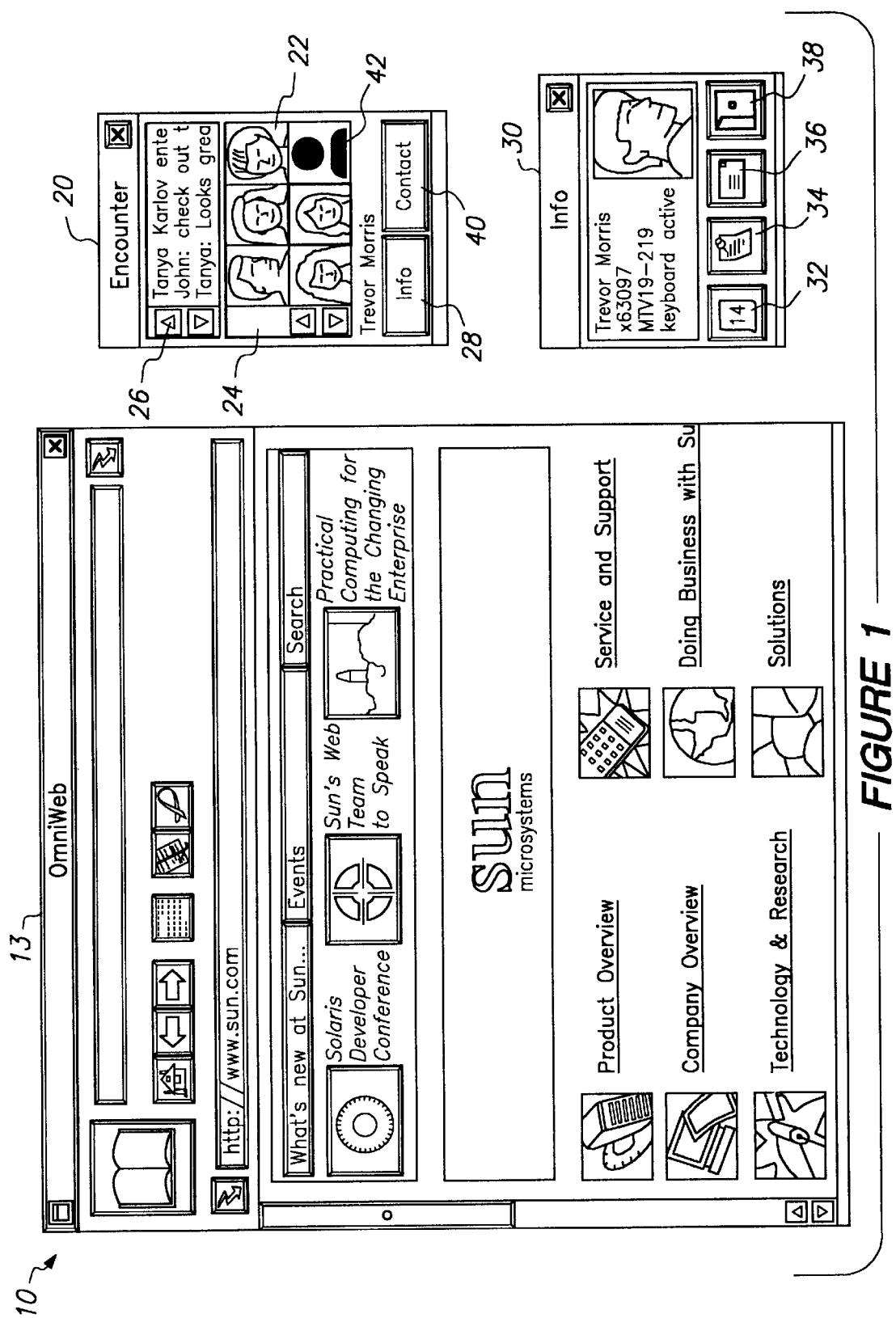
FIG. 1 is an illustration of an encounter window, on a computer display, in open mode, compact format, according to an embodiment of the present invention.

Referring now to FIG. 1, there is shown one embodiment of a user interface of a mechanism enabling awareness of other users who are task proximate. FIG. 1 illustrates the screen display, commonly called the "desktop" of a particular user, called here, the current worker. The desktop is produced on the display screen of the current worker's computer. On the desktop 10, there is an application window 13 for a browser application, and one embodiment of an encounter window 20, which is the user interface portion of the encounter mechanism. The encounter window 20 provides a visual mechanism for informing the current worker which other workers are task proximate. The encounter mechanism further provides aural indication of task proximate workers. For those workers who are task proximate, the encounter mechanism provides a means of efficiently initiating an interaction with such workers.

For each worker who is task proximate to the current worker, the encounter window 20 displays an appropriate representation of the worker. In the preferred embodiment, the representation is an icon 22. The icon 22 may a bit-mapped image of the worker. In alternative embodiments, other forms of representation may be used, such as various graphic image formats, real-time video, a simple text string, or other information, depending on the level of hardware support available to each worker, the network bandwidth available, and the level of privacy each worker desires. For workers with computers including video cameras, the representation may be created by capturing a video image of themselves. For workers without video support, an icon can be selected from a set of icons or created by the worker, or a text string may be used.

The encounter window 20 is periodically updated as new workers become task proximate to the current worker, and other workers lose their task proximity. As either the current worker or other workers context switch between applications, the encounter window 20 is updated to display the icons 22 of those workers who are then task proximate to the current worker. When a worker on a remote computer uses an application and becomes task proximate to the current worker, the encounter window 20 provides a visual/aural cue of same, with an icon 22 appearing for the other worker in the encounter window 20. When the person is no longer task proximate their icon 22 is removed. The encounter window 20 thereby provides a subtle indication to the current worker that there has been a change in the task proximity of other workers.

Task proximity may be based on any of three distinct factors: 1) the application the worker is currently using; 2) the data the worker is accessing or manipulating; and, 3) the time at which such actions occur. These factors are variously used to define a user's position in a "task space." The strictest definition of task proximity is having two workers who are using a same function of the same application on the same data file at the same time.

The definition of position and task proximity can be independently relaxed along each of the above listed factors. For example:

The application constraint may be relaxed so that workers viewing the same data with different applications, or application types, are still task proximate. Examples include viewing the same World Wide Web page with different web browsers, or accessing the same database table with different database applications. Alternatively, the application constraint may be tightened so that even in the same application, two workers would have to be performing the same function, such using a spell checker in a word processor, compiling code in a compiler, and the like. Workers using the same application but performing different functions may be considered to be not proximate.

The time constraint may be relaxed so that workers accessing the same data within a predetermined time period of each other may be task proximate. For example, workers accessing the same stock quotation within a quarter-hour could be task proximate to each other. Similarly, workers accessing the same web page or email message within one hour, or the same word processing document within one day, could also be task proximate.

The data constraint may be relaxed so that workers using the same application, but accessing different data may be task proximate. For example, workers accessing different files in the same file directory with a file browser could be task proximate. As another example, a worker viewing the calendar of a particular person for a specific date would be task proximate to other workers viewing the same person's calendar for different dates. Similarly, when viewing a calendar on a selected date to schedule a facility such as a conference room, a worker would be task proximate to other workers viewing the calendar on that date and scheduling a different conference room.

Task proximity is preferably determined with respect to an application that is currently active, or most recently active. Task proximity can be determined by the applications, or by other software components that have information about the position of the users. This information is preferably provided by the applications. Applications that can provide this information are "encounter-aware." It is preferred that applications of a given type determine task proximity in the same or similar manner. An application's type is generally based on the nature or domain of use, for example, databases, word processors, mailer, code compilers, and so on. Some applications may be considered as having more than one type. For two applications of a given type it is preferred that there is substantially the same determination of task proximity for their respective users.

Figure 2:
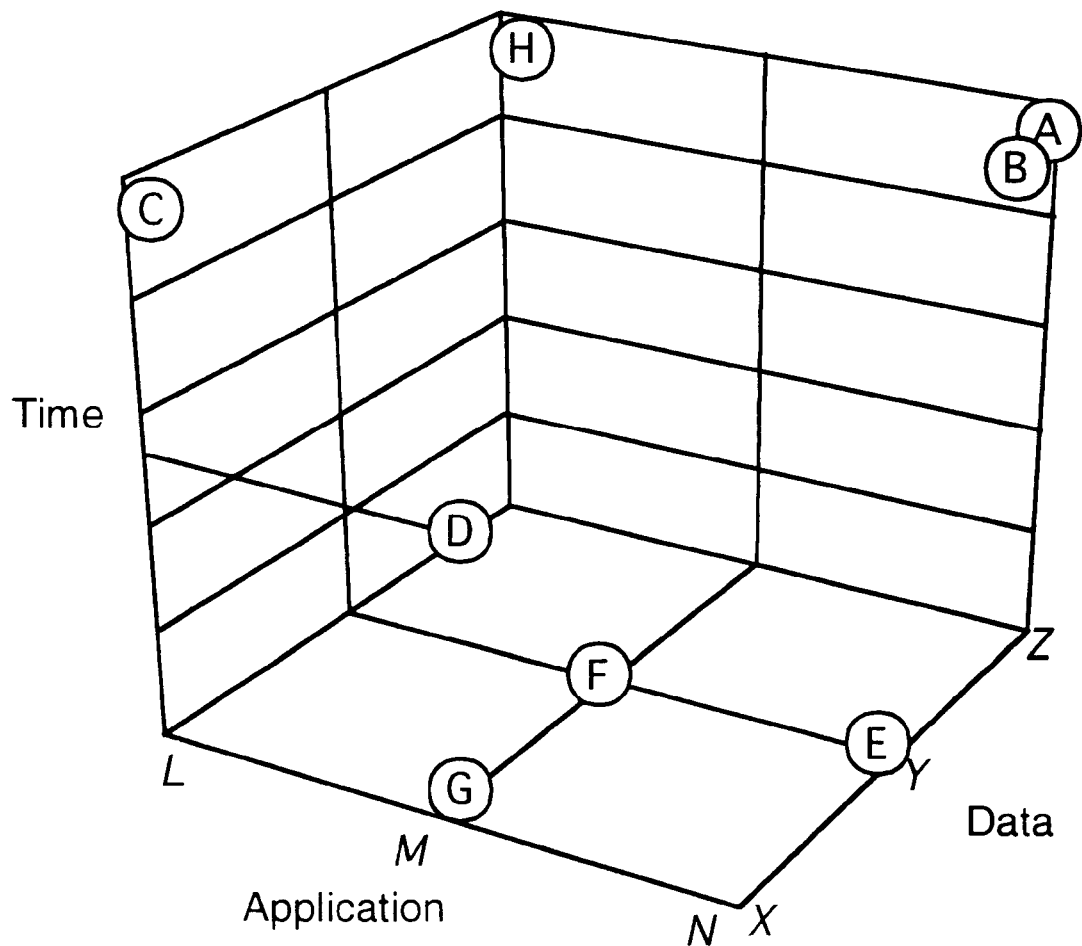
FIG. 2 is an illustration of a task space.

FIG. 2 illustrates a variety of task proximity relationships. FIG. 2 represents a task space with axes defined by the three factors described above. In the task space individual workers are represented by labeled circles. Along the application axis there are three encounter aware applications, L, M, and N. Along the data axis there are three data files, X, Y and Z. Time is continuous. Workers A and B are both using application N to access data file Z at the same time. If N and other applications of N's type enforce this definition of task proximity, then both A and B would see each other's representation in their encounter windows.

Workers C and H are in application L, which relaxes the data and application constraints. Application L applies a proximity definition such that two workers are task proximate if they are both using application L or, if not both using the same application, then accessing the same data. Application L does impose a strict time requirement. Thus, worker C and worker H are task proximate since they are both in application L at the same time, but accessing different data, and they would both appear in each other's encounter window. In addition, application L considers worker H to be task proximate to workers A and B, since they are accessing the same data file Z at the same time as H, but using different applications. An example of this situation would have applications L and N being different World Wide Web browsers, and data file Z being a WWW page. As another example, workers G and F are using application M at the same time on different but related data files, and would appear in each other's encounter window.

In one preferred embodiment, task proximity is symmetrical, so that if a first worker appears in a second worker's encounter window, then the second worker appears in the first worker's encounter window. This is desired in order to prevent lurking.

However, in some instances asymmetry is preferred or necessary, for example when relaxing the time constraint. For example, workers D, F, and G are using application M which employs a task proximity definition that requires the same application, but relaxes the time constraint partially, and the data constraint. In this example then, workers D and G both access data file X, but at different times (e.g. D accesses data file X some time after G does). Thus, worker G would appear in worker D's encounter window, but D would not appear in G's encounter window.

Worker E is using application N on data file Y at the same time that workers G and F are in application M. However, they do not appear in each other's encounter windows because both applications M and N require identity of application. These are but a few of the types of task proximity relationships possible.

While the foregoing examples refer to individual applications, the definition of task proximity is preferably consistent within a given type of application, regardless of the specific implementations of each instance of the application. Further specific examples of task proximity definitions for application classes include (but are limited to):

| Application Type | Task Proximity Definition |
| --- | --- |
| text editor/word processor | same data file. |
| file browser | same directory tree, or within one directory level. |
| email application | same message. |
| code development environment | code file at same level of code tree. |
| calendar browser | same calendar file or same date. |
| web browser | same web page. |

The examples merely illustrate the various ways of defining task proximity for different types of applications. For any of these classes the time constraint has not been applied because it can be relaxed by varying degrees, depending on the size of the installed based, and hence the number of workers who may become task proximate in a given time period for a given data file, or other factors.

In the preferred embodiment, the encounter mechanism provides various modes of "awareness" about other workers.

The modes allow the current worker to control the degree to which the encounter mechanism intrudes upon his or her experience. The mode of awareness is specified by each worker independently, and controls both ends of the encounter mechanism, namely, how the encounter mechanism appears to the current worker, and how the current worker appears in the encounter window 20 of other workers. The mode of awareness may be specified as applying to all applications on the desktop, or may be specified in each application individually. In the preferred embodiment of the encounter mechanism, there are three modes of awareness for the encounter mechanism, including open, minimal, and closed. The mode of awareness is selected from a menu or by clicking on the mode icon 18.

The open mode of awareness is used by workers who are receptive to interacting with other workers who are task proximate. When the encounter mechanism is specified as "open," the worker sees the representations of workers who are task proximate, and these representations are updated as workers change their task proximity. When a worker sets the encounter mechanism to be in the open mode, that worker's visual representation will appear in other workers' encounter window. Further, in the open mode one may obtain additional information about such users, such as their email address, telephone number, fax number, mail address, and the like, and initiate an interaction with any number of these workers, through such means as a video conference, email message, and the like.

In addition to the visual representation of workers in the encounter window, an aural indication may be used to indicate each time a worker becomes task proximate, or loses task proximity. Different aural indications may be used for each of these events, for example, with a long beep tone when a worker becomes task proximate, and a short beep tone when a worker loses proximity. Other sound effects may also be used.

In the preferred embodiment, the addition or removal of icons 22 to or from the encounter window 20 is done by a visual transformation of the icons 22 as the workers become task proximate or lose task proximity. The visual transformation may include a fade, wipe, dissolve, pull, or other gradual visual effects that unobtrusively place and remove the icons 22. Such visual transformations more naturally reflect the gradual acquisition of awareness of the comings and goings of workers that workers typically have in physical workspaces.

At any time there may be a large variation in the number of workers who are task proximate to the current worker, as a consequence of the time of day, application base, network size, and other factors. Also, some applications are intended to involve large numbers of different users simultaneously, such as video broadcasting presentation software. In order to accommodate these variations, the user may control the appearance of the encounter window. There are preferably at least two different ways the encounter window 20 can appear when the encounter mechanism is open. For applications where it is anticipated or in fact there are a relatively small number of task proximate workers, the encounter window 20 displays the representations of these users in a compact window format. FIG. 1 illustrates the encounter window 20 as it would appear with an open mode of awareness with the compact format.

In the compact format, the encounter window 20 includes the representations of the task proximate workers in a scrollable window pane 24. A scrollable text area 26 provides information about which workers have become task proximate and which have 'left.' In addition, the shared text area 26 allows the workers to communicate with each other by a text dialogue.

The compact format further provides means for obtaining information about the task proximate workers, and a means for contacting one or more workers. In FIG. 1, the info button 28, will bring up another window, called a business card 30, for a selected representation of one of the task proximate workers. The business card includes information useful for contacting the worker, such as the worker's telephone extension, mail stop, facsimile number, email address, and so forth. In the preferred embodiment, the business card 30 is a specific view of information about a worker that is stored in a globally accessible database.

Frequently, a worker has multiple applications running, but may not be using the computer for some reason. As one of the goals of the encounter mechanism is to increase the likelihood that the current worker can successfully communicate with task proximate workers, the encounter mechanism provides information about whether other workers are currently using their computer. One way this information is presented is in the business card 30, which includes text data indicating whether or not that the worker's keyboard, or other input device, is presently active, as shown in FIG. 1. If the worker's input device is not active, the encounter mechanism may provide either the length of time since the last activity, or it may provide the time stamp of the last activity.

The business card 30 further provides access to other information about the worker, such as the worker's calendar 32. The current worker may also access information such as the idle time of the worker, and the time since they became task proximate. The business card 30 further is useful to inform the current worker of the identity of other workers with whom a particular worker is interacting, thereby letting the current worker assess the propriety and likelihood of success in attempting to communicate with such worker.

In addition, the current worker can initiate communications with any other worker. Such interactions include posting a text message to the worker owning the business card through the stick-up button 34, or sending email to the worker through the email button 36, or initiating a video conference with the worker through the video-conference button 38. Each of these interaction formats is provided by appropriate services interfaces in the operating system or application framework. In one embodiment, these various services are managed by a communications server that interacts with a object request broker to couple the communications application (such as a video conference server) on one user's computer to a second user's computer.

More particularly, a contact button 40 allows the current worker to initiate an interaction with one or more selected workers. In one embodiment, the current worker selects one or more of the representations in the encounter window, and then presses the contact button 40. The encounter mechanism, in conjunction with a communications server, then selects a communication mechanism, such as video-conferencing, email, text chat, audio, or the like, depending on the available hardware/software support of each worker. Thus, if both workers have video capability, then a video conference is selected. If only one worker has video capability, and the other, audio support only, then an audio-only dialogue is initiated, and so on.

For applications or contexts in which there are a large number of workers proximate to a current worker, the encounter window 20 may be operated in an extended format. FIG. 3 illustrates one embodiment of the extended format. The extended format is useful for applications such as web browsers, databases, or network broadcasting applications where many workers may be using the application simultaneously.

In the extended format, additional functionality is provided to enhance the current worker's ability to find and organize representations of the task proximate workers. In FIG. 3, the encounter window 20 is arranged to display a larger number of icons 22, the current worker may switch to a display of names using the radio button 29. This produces the display in FIG. 4. The current worker may then sort the set of workers by any number of keys 27, including the worker's name, the time at which the worker became task proximate (either most recent or least recent), the idle times of the workers, or the interaction activity, with workers who are interacting with each other appearing at the top of the window pane. This last sort key enhances the collaborative nature of the encounter mechanism, allowing each worker to see both those other workers who are task proximate and those who are interacting. The worker may also search for specific workers, again, using a variety of search keys, such as personal information, including name, location, department, and the like, or other information, such as activity level, and the like.

The formats of the encounter windows are associated with particular functionality. Since in any application the number of users may vary, the current worker can switch between formats of the encounter window 20 to control functionality, as additional workers "enter" (become task proximate) or "leave" (lose task proximity) the current worker's personal task space. Switching between formats may be implemented in numerous ways, including re-sizing the encounter window 20 with a suitable user interface element or keystroke.

In addition to controlling the format of the encounter window 20 during the open mode, in one embodiment the worker may also control the sensitivity of the task proximity display, so that the user can distinguish whether a given worker is accessing the same data at the same time, same data at different times, different but related data at the same time, or the like. This allows the user to assess the significance of the task proximity of each worker. These degrees of task proximity may be indicated by different color borders on the icons 22, different border patterns, or positioning of the icons 22, or other visual attributes. For example, using position as a indication of degree of task proximity, the "closer" (more task proximate) workers would placed at the top of the encounter window, and the "farther" (less task proximate) workers would be placed at the bottom.

Figure 5A:
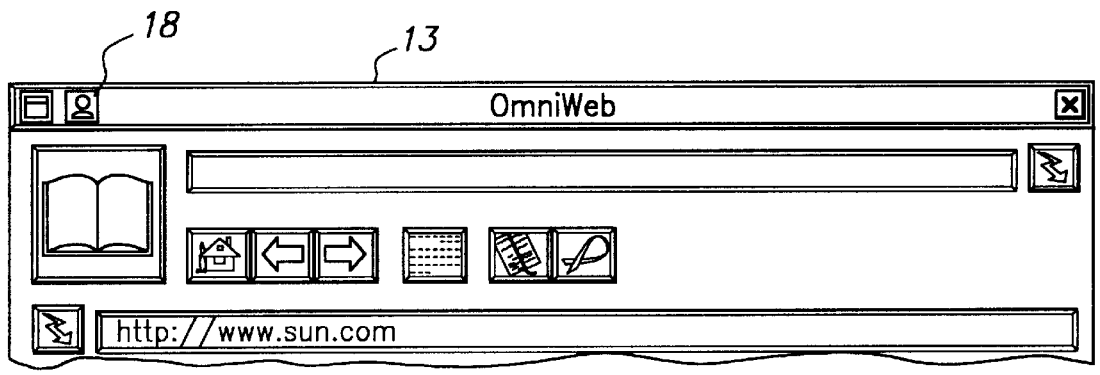
FIGS. 5a and 5b are illustrations of the encounter window in a minimal mode.
Figure 5B:
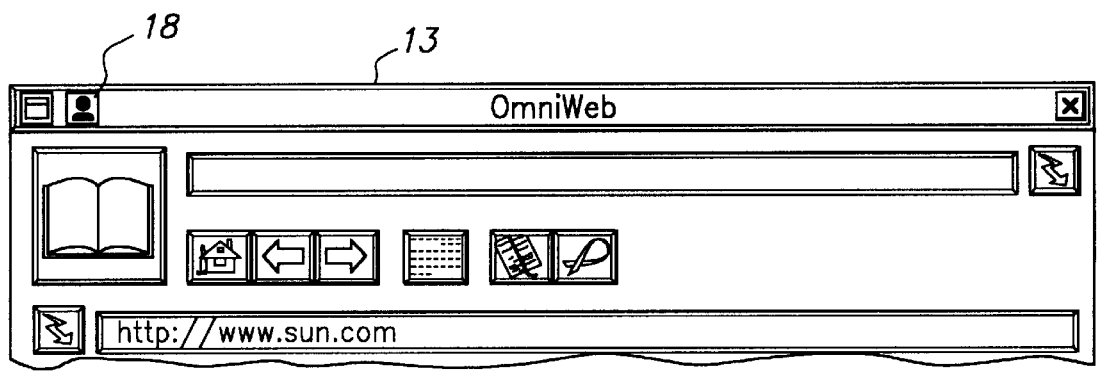

In some instances, a worker may only want to be peripherally aware of others in the task space in order to concentrate on a particular task or for other reasons. The current worker may then place the encounter mechanism in its minimal mode. In the minimal mode, the encounter mechanism provides an indication only of whether or not at least one other worker is task proximate, but not who the task proximate workers are. This indication may be provided by a simple, relatively small icon. FIGS. 5a and 5b illustrate an example of the minimal mode, with the minimal mode icon 18 displayed at the top of the window 13 for a web browser application. FIG. 5a illustrates the minimal mode icon 18 showing that no other workers are task proximate, with the icon of a person being hollow. The first time the current worker becomes task proximate to another worker, the minimal mode icon 18 is updated to suggest a person being present, as shown in FIG. 5b. Other workers entering the current worker's task space do not cause a change in the icon. When the last worker loses task proximity to the current worker the icon 18 reverts to its blank state as shown in FIG. 5a. In addition, the minimal mode optionally includes aural indications commensurate with the visual ones, with distinct tones for when a worker enters the task space and for when a worker leaves the task space.

Finally, the current worker may not be interested in being aware of any other workers at all. Accordingly, a closed mode is provided in which the encounter window 20 is not used at all, and the current worker receives no information about the task proximity of other workers.

In the preferred embodiment, in addition to controlling what a worker sees in their encounter window, the modes further control what other workers see of the particular worker. In the open mode, a worker's representation, whether image, video, or the like, is provided to the encounter windows 20 of other workers who are task proximate. The representation is as shown in FIG. 1, with the images of the various workers.

In the minimal mode, a worker desires to be only minimally aware of other workers, and this desire is communicated to other workers who are task proximate. Accordingly, a worker in the minimal mode is seen in other worker's encounter window 20 with an icon or other image representative of the minimal mode, such as a silhouette 42, shown in FIG. 1.

Finally, when a worker is in a closed mode, no representation is provided to other task proximate workers, again, consistent with the first worker's intention to not receive or send this state information. Accordingly, the mode of the encounter mechanism is preferably symmetric with respect the information provided to, and received from, other workers. Alternatively, the worker can specify for each mode the type or degree of information to be provided back to other workers.

All the modes may be specified for all applications that a worker is using, or individually for each. For example, a worker may desire to be in an open mode for a web browser, and desire to know which other workers are proximate to the web page, since this may provide further useful information about the activity or task in which the worker is engaged. However, in a tool, such as a spreadsheet or database, or the like, the worker may desire to be in a minimal state, merely knowing if anyone else is also working on a similar task. Finally, for another application, for example, a word processor, the worker may not want to be disturbed at all.

Figure 9:
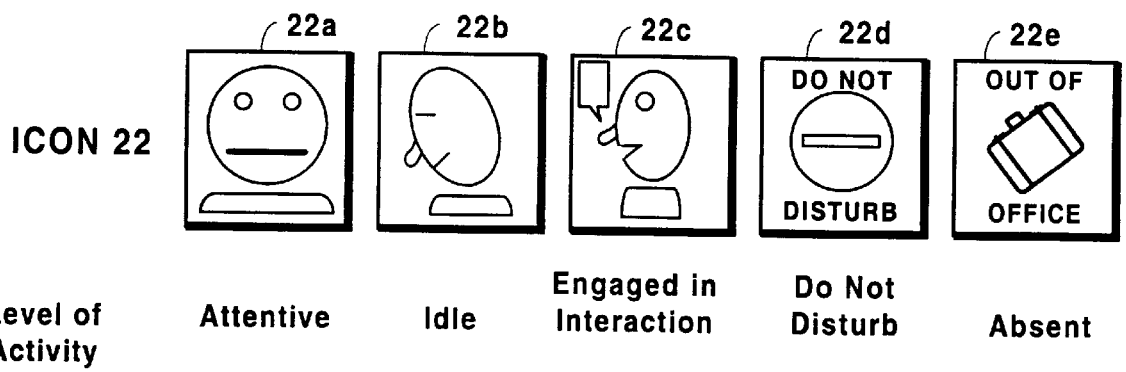
FIG. 9 is a set of icons illustrating various levels of availability.

In another alternate embodiment of the present invention, further information about the availability of workers who are task proximate may be displayed in the encounter window 20 by variations in their icons 22. Availability may be usefully divided into at least five levels: active, idle, engaged, do not disturb, and absent. For each of these levels of availability, there may be assigned a default icon or a user defined icon, each of which visually and distinctly suggests or indicates the associated level of availability. Exemplary icons 22a–e associated with distinct levels of availability are illustrated in FIG. 9. The level of availability is determined in one embodiment as a function of the worker's use of their computer, for example, by monitoring their keyboard activity, and using the keyboard inputs per unit of time as a metric for determining the current level of availability. Additionally, the worker's computer and its interconnection with the computer network's communication architecture may be used to determine whether a worker is engaged in an interaction (e.g., telephone, video-conference) with another worker. Procedurally, after a worker is determined to be task proximate, the worker's icon 22 is updated to reflect their current level of availability. As long as the worker remains task proximate, their icon 22 is periodically updated to reflect their current level of availability.

For example, in a typical instance, a second worker will become task proximate to a first worker while being at an active level of availability. Accordingly, the second user's icon 22 will be illustrated in the first user's encounter window 20 with icon 22a, as in FIG. 9, or the like. If after a period of time while the second user is still task proximate to the first user, the second user becomes idle, then the icon 22a will be updated to reflect this current level of availability, such as with icon 22b. Later if the second worker then enters into an interaction with another worker (regardless of whether that other worker is task proximate to either the first or second user), then the second worker's icon is again updated, for example to icon 22c.

Preferably, the changes in the level of availability icons 22 are made using gradual visual transformations, such as fades, wipes, dissolves, and the like, to reduce the obtrusiveness of the change. The use and implementation of level of availability information is further described in the related application referenced above.

Architecture of the Encounter Mechanism

Figure 6:
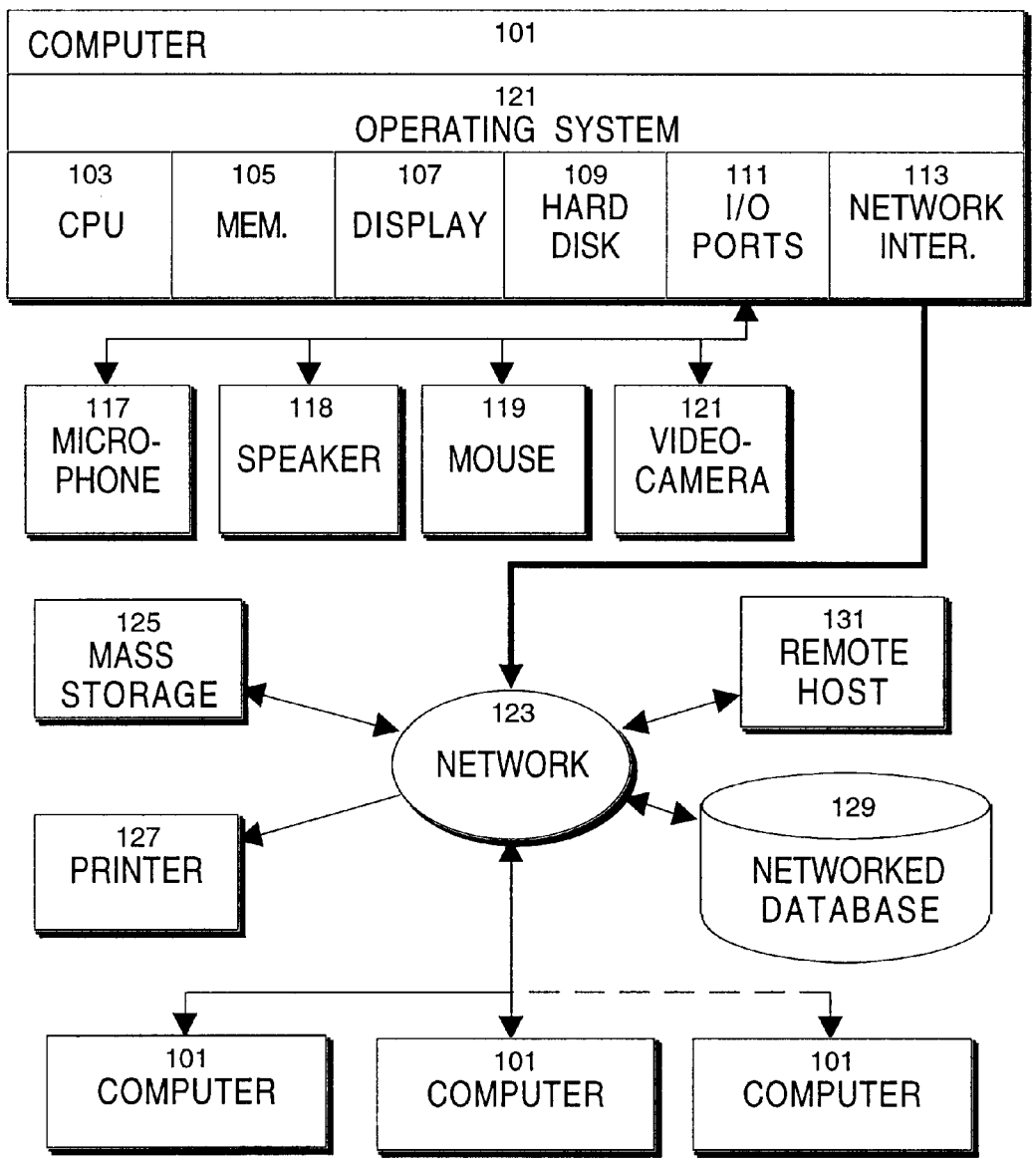
FIG. 6 is a block diagram of the hardware elements of a computer system supporting the present invention.

Referring now to FIG. 6, there is shown a block diagram of one system providing an encounter mechanism. The system includes a number of computers 101 connected on a network 123. Each computer 101 includes a processor 103, an addressable memory 105, a display 107, a local hard disk 109, input/output ports 111, and a network interface 113. Each computer 101 further preferably has coupled to its I/O ports a conventional mouse 119 or other pointing device. Additionally, computers 101 may include audio capability through a microphone 117 and speaker 118, and video capability through a video camera 121. Users connect to the network 123, such as a LAN, WAN, or the like, through the network interface 113, and access remote servers 129, such as naming service, printers 127, storage devices 125, or other computers 101, or remote hosts 131. A suitable computer includes a SPARCstation™ computer manufactured by Sun Microsystems, Inc. of Mountain View, Calif. [1] Any other general purpose computer may also be adapted for use with the invention. Each computer 101 executes a general purpose operating system, such as Sun Microsystems' Solaris™ operating system, with the OpenStep™ windowing environment from Next Computer. Typically, each computer 101 is dedicated to a single worker, though a computer 101 may support multiple workers accessing various different applications as servers to clients on their own computers 101.

[1] Sun and Solaris are trademarks, or registered trademarks of Sun Microsystems, Inc., in the United States and other countries. All SPARC trademarks are used under license and are trademarks or registered trademarks of SPARC International, Inc. in the United States and other countries. Products bearing SPARC trademarks are based upon an architecture developed by Sun Microsystems, Inc.

Figure 7:
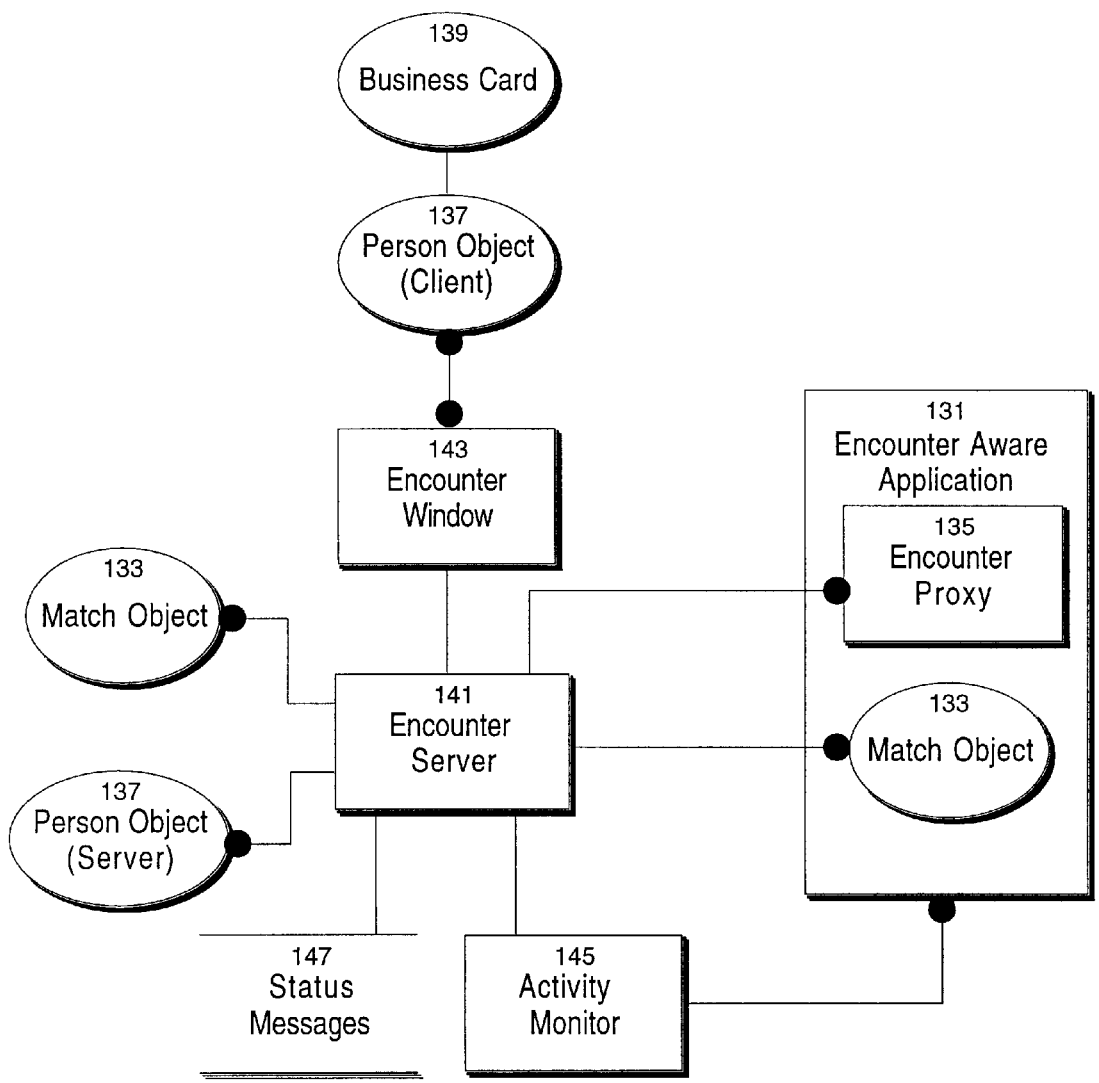
FIG. 7 is an object model of the system architecture for one aspect of the present invention.

The addressable memory 105 of each computer 101 further includes software components useful for implementing the encounter mechanism for one embodiment of the present invention. FIG. 7 illustrates an object model of the architecture of the encounter mechanism.

In the encounter environment, each worker or user has a person object 137. A reference to the person object 137 stores user specific information, such as their user name, account ID, and the like, as conventionally used to create a user handle. The person object 137 further stores the desired representation of the user, as displayed in the encounter window, such as a bit-mapped image, Postscript data, draw object, or text string. These representations may be created automatically or manually, and may be modified by the user. In a preferred embodiment with a large number of users distributed across many different computers 101, there will be a high amount of network communication devoted to periodically updating the encounter windows 143 of each worker. Accordingly, person objects 137 preferably have a compact data structure to reduce the amount of information that is passed between the various components of the encounter mechanism. A reference to the person object 137 is preferably stored in a centralized database 129 such as a naming service which provides a handle to a given user's person object 137 in response to a query presenting the user's name.

In addition, selected data of a person object 137 may be viewed through a business card object 139. In a preferred embodiment, the business card 139 is a view on a person object 137 generated by either the encounter window 143 or other client applications from the person object 137. The business card 139 displays for each user information useful for contacting the user, such as the user's full name, address, email address, telephone number, facsimile number, and the like. In the preferred embodiment, the business cards 139 are extensible, and allow each worker to define one or more new fields for storing additional information about other workers in a locally cached business card 139 component. Such information could be either static data about the individual (e.g. their pager number) or functional information that facilitates an interaction (e.g. a reference to a service that dials the pager).

The business card object 139 further includes methods for initiating communications with the represented worker. The business card object 139 integrates with existing desktop communications facilities, such as email services, video conferencing, and the like. Generally, in a distributed computing environment a user's local communication client would pass an object reference of a communication server of another worker to an object request broker, which then returns the handle of the communication server to the client. The local client then initiates the communication directly with the communication server. Other mechanisms are also possible. For email communication, for example, the current worker would request the email address of another worker from the person object 137 of that worker, and pass it to a mail tool, which then creates an email message to the recipient.

Also in the preferred embodiment, each person object 137 or business card 139 is a pasteboard type that allows these objects to be cut and pasted between applications, so that users can pass the information about workers between each other through the communication services.

There is further provided on each computer 101 a single encounter window 143. Each encounter window 143 displays representations, such as icons 22, associated with various person objects 137. Across multiple computers 101 there will be multiple encounter windows 143, and so the representation of a single person object 137 may appear in any number of these windows 143. The encounter window 143 provides the functionality described above regarding the modes of awareness, the communication abilities, and the representation of workers therein.

While enabling awareness of, and communication with, other workers is desirable, a worker should be able to control who has access to him in order to maintain and enhance a sense of privacy. In this embodiment, the present invention provides sufficient mechanisms for salient cues of a worker's availability, so that other workers can rely on social mechanisms of protecting individual privacy. In addition, the specific mechanisms are provided in the encounter window to control which other workers have access to the current worker. The worker may enable or disable various ones of the communication services, such as video-conferencing, to control the degree to which he may be contacted by other workers. In addition, the user can control the level of awareness, by selecting either the open, minimal, or closed mode, preferably with the mode icon 18.

Each person object 137 is indirectly known to one or more encounter-aware applications 131. Generally, each encounter-aware application 131 is used by a single worker at a time. However, in an alternate embodiment, an encounter-aware application 131 may be accessed by multiple users from other computers 101, the application 131 being a server to remote clients.

At any point in time, a user of the application 131 is accessing a particular function and particular data. This information may be represented by file names, object names, pointers, or other means. Each time a user changes the function or data being used, the encounter aware application 131 sends a status message to its encounter proxy object 135. The status message specifies the data or function the worker is currently using, or combination of these elements. The status message may be a string with the name of the data file(s), and a reference to a function, and can include additional information useful to determining each user's position.

Associated with each encounter-aware application 131 is an encounter proxy object 135. The encounter proxy object 135 provides the encounter-aware application 131 a communication mechanism to the encounter server 141. The encounter proxy object 135 accepts from the application 131 a status message describing the user's current position in the application 131. The encounter proxy object 135 is able to obtain a handle to the person object 137 of the worker. The encounter proxy 135 also knows the identity of the application 131 with which it is associated. The encounter proxy object 135 binds the worker's handle, and application identity with the status message and passes it to the encounter server 141. In this manner, the application 131 does not have to interface directly with the encounter server 141.

The encounter proxy 135 further provides to the encounter server 141 a handle to a match object 133 included in the encounter-aware application 131. This allows the server 141 to directly communicate with the match object 133 and pass to it user position data for a determination of the task proximity of two users. The handle to the match object 133 is provided to the encounter server 141 preferably when the application 131 is executed as a new process.

For each user on each computer 101 there is provided an encounter server 141. The encounter server 141 informs the encounter window 143 of a given user when a representation of person object 137 has to be updated. The encounter server 143 does this according to status messages received from encounter proxy objects 135 on the same computer 101, and from encounter servers 141 on other computers 101. If a user is logged on to two computers 101, there are two encounter servers 141 for the user. Similarly, there may be multiple servers 141 on a single computer for multiple users.

An encounter server 141 maintains a list of the encounter-aware applications 131 on the computer 101, receiving the information about each application 131 from its encounter proxy 135. The server 141 further maintains information identifying which application 131 is currently active (other applications 131 may be operating in the background) for the user. This information is provided by the windowing environment, and is updated from time to time as the active application 131 changes.

The encounter server 141 receives the status messages from the encounter proxy objects 135 on its computer 101, and from other encounter servers 141, and stores these status messages 147. The status messages from the encounter proxy objects 135 identify the application 131, the user's position in the application 131, and the user's handle and position, and a handle to the match object 133 contained in the application 131, if any. In the preferred embodiment, when the encounter server 141 receives a status message from an encounter proxy object 135, it adds a timestamp to it. The timestamp is useful for ordering the appearance of icons 22 in the encounter window 143, and determining task proximity. The encounter server 141 then sends the status message to all other encounter servers 141 on the network 123.

When the encounter server 141 receives a status message, it compares the received message with stored status messages 147 and identifies status messages that include the same application type or application name, or other matching criteria, and sends the position data included in such status messages to a match object 133 for determining whether the users specified in the status messages are task proximate according to their positions. The encounter server 141 preferably invokes the match object 133 of the currently active application 131.

In a preferred embodiment, the determination of task proximity is made by a match object 133. Each application 131 may have a match object 133 that applies a task proximity rule particular to the type of application. In addition, the encounter server 141 may also have its own library of match objects 133, each one particularly adapted to determining task proximity for different types of applications 131.

Where an application 131 does not have a match object 133, it may indicate to the encounter server 141 the type of match object 133 to use from a library, such as indicating a file name comparison, or a file name and application type, or a file name and time stamp, or any other combination of data. If the application 131 does not indicate the type of match object 133 to use, the encounter server 141 preferably uses a match object 133 that performs a simple string comparison.

Where the application 131 has a match object 133, the application 131 preferably registers the match object with the encounter server 141 through the encounter proxy object 135, with the encounter server 141 receiving and storing a handle to the match object 133. When the encounter server 141 wants a determination of task proximity, it uses the handle to invoke the match object 133 of the currently active application 131.

In an alternate embodiment, when encounter-aware application 131 starts, its match object 133 is copied down to the encounter server 141, thereby migrating the match object 133 to the encounter server 141. This embodiment supports a relatively fast implementation.

The match object 133 receives from the server 141 two status messages, one describing the user's current position, and one describing the position of another user, typically on a second computer 101. The match object 133 determines whether the users are task proximate to each other, using a predetermined task proximity function. The task proximity function may be a string comparison between the position data for each user, or a more complex function including arithmatic or Boolean comparisons of the time stamps, data files, and the like.

The match object 133 returns an appropriate status value indicating whether or not the two users are task proximate, or alternatively, indicating one of several possible levels of task proximity, as set forth above. With the result from the match object 133, the encounter server 141 informs its encounter window 143. The encounter window 143 then updates its display, either adding a new representation for the task proximate worker, deleting an existing one, or making no change at all.

On each computer 101 there is provided an activity monitor 145. The activity monitor 145 monitors keyboard, mouse, and other input devices to determine whether the worker is currently using the computer 101. If there is no activity for a predetermined length of time, the activity monitor 145 sends a message to the encounter server 141 that the user is idle. This status message includes a handle to the person object of the user, the machine identification number of the user, and an active/idle flag. The encounter server 141 then sends a status message to all other encounter servers 141 on the network 123 indicating the user is not active. The other encounter servers 141 update their encounter windows 143 accordingly. When another worker brings up the idle worker's business card 139, it will indicate that the worker is not active. When a user becomes active again, the activity monitor 145 sends a status message with an active flag to its encounter server 141, which again broadcasts the status message to the network 123.

Figure 8:
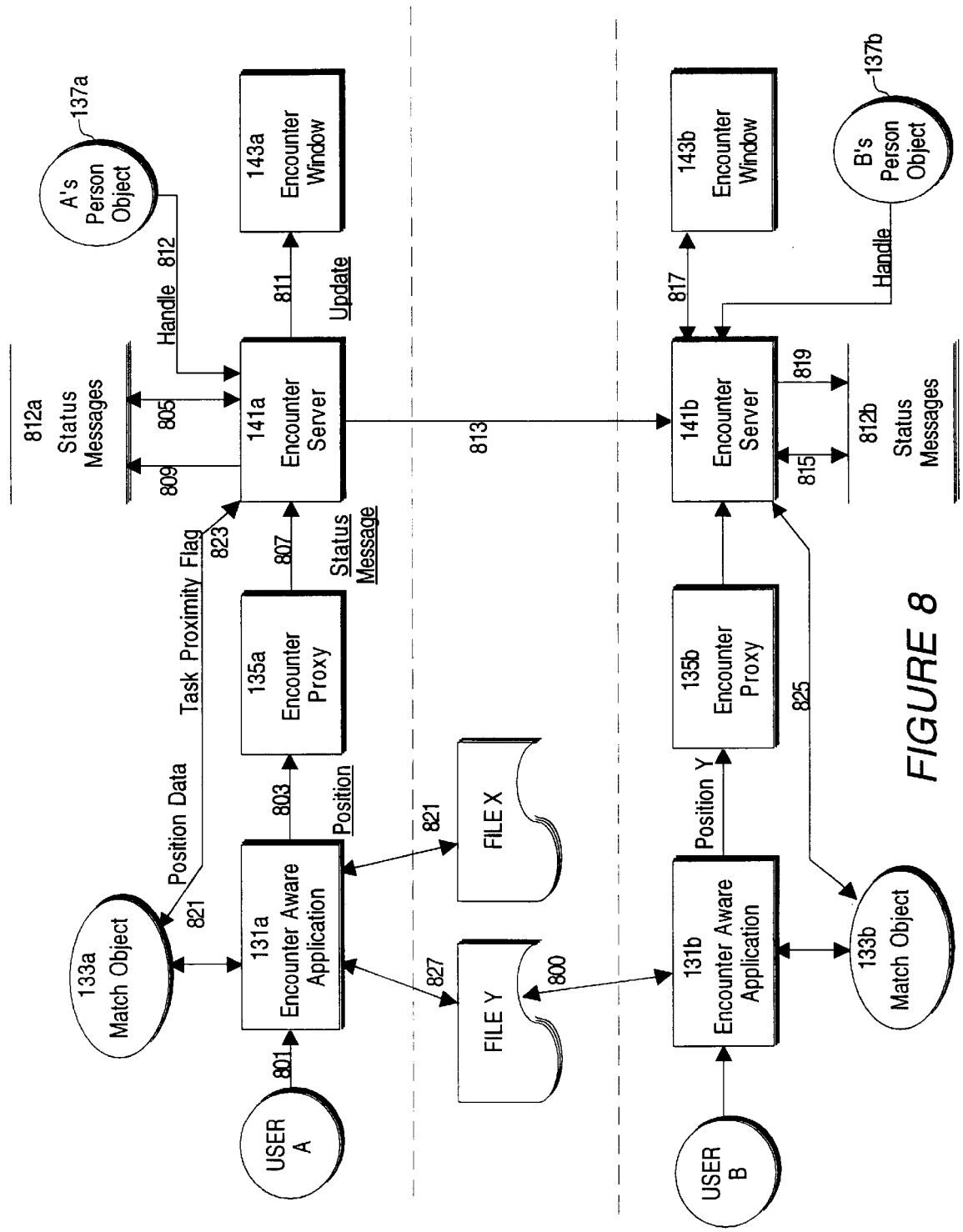
FIG. 8 is an event trace illustrating the typical behavior of the encounter mechanism.

An example of the operation of the encounter mechanism is illustrated in FIG. 8. Assume two workers, A and B, who may be on separate remote computers or on the same computer. Each worker has an encounter aware application, here an editor 131a, 131b, which contains an encounter proxy object 135 and a match object 133. Each application 131 is preferably built with an application framework that provides notifications when the application 131 becomes active. Each worker has their own encounter server 141a, 141b, and encounter window 143a, 143b. Each encounter server 141 has a handle to the match object 133 of the application 131 being used by the worker associated with the server 141. All communication between the computers 101 is through the encounter servers 141. Each worker is assumed to have their respective encounter windows 143a, 143b in open mode. In this example, the match object 133 is associated with the encounter-aware application 131, though as noted above, it may be associated with the encounter server 141. Also, the activity monitor 145 is not shown for ease of explanation.

Worker B is currently working 800 in his application 131b, as editor, on data file Y. Worker A starts 801 her application 131a, also an editor, making it the active application on her computer. The editor 131a, via the application framework, informs 803 the encounter proxy object 135a that the editor 131a is active. The encounter proxy object 135a sends 807 a status message to the encounter server 141a, indicating that the editor 131a is active. The status message includes the name of the editor 131a, a null position, and a handle to the match object 133a associated with the editor 131a. The position is originally null since worker A has not yet selected a data file to edit. A null position indicates that worker A cannot be task proximate to any other worker at that time, and hence worker A will not appear in any other worker's encounter window 143, nor will any other worker appear in worker A's encounter window 143a. The handle to the match object 133a is used to register that object with the server 141a.

The encounter server 141a stores 809 as a status message 812a a handle for the editor 131, including the editor name, the match object 133a, and worker A's position. As a worker can have only one application active at a time, this information describes worker A's current application and position. Worker A's encounter server 141a sends 811 a message to the encounter window 143a indicating the current position of worker A. Since the position is null, there is no need to invoke a match object to determine the task proximity of other workers, and so the encounter window 143a clears all current icons 22 or other workers. Storing a handle of the match object 133a enables the encounter server 141a to subsequently invoke that object for determining task proximity between worker A and other workers.

The encounter server 141a also multicasts 813 a status message to all other encounter servers 141 on the network. This status message includes a handle 812 to worker A's person object 137a, an identification number for the computer executing the encounter server 141a, which is worker A's computer, a timestamp generated by the encounter server 141a, the name of the editor 131a, and the position of worker A, which is null.

Worker B's encounter server 141b receives this status message. This encounter server 141b searches 815 its stored status messages 812b, attempting to match the worker A's handle, and worker A's machine identification number to previously received status messages. These stored messages include a status message indicating that worker B is at position Y. If there is a previously stored status message, then this means that worker A may have been task proximate to worker B at some point in the past. Accordingly, the encounter server 141b further determines 817 if the encounter window 143b is displaying a representation of worker A, such as an icon or other image. If so, the encounter server 141b sends a message to the encounter window 143b to remove the representation of worker A, since because of her null position, she is no longer task proximate to worker B, regardless of what worker B is doing. The encounter window 143b accordingly updates itself. If there was no previously stored message, then the encounter window 143b need not be updated.

The encounter server 143b stores 819 the status message for worker A, replacing any previous status message about worker A. Since, worker A's current position is null, there is no need to determine whether worker A is task proximate to worker B.

Worker A now loads 821 data file X and begins editing it. Worker A's editor 131a sends 803 a message to its encounter proxy object 135a indicating a change in position. In this example, the editor 131 determines task proximity based on identity of data files with a determined time period; here, identity of function within the editor 131 is not required. In this example then, the message from the editor 131a to the encounter proxy object 135a indicates the new position based on data file X, and this position will be called "position X." In other embodiments, the function being used by the editor 131 or other application would be included in the position.

The encounter proxy object 135a sends 807 a status message with the current position X, and editor 131a name to the encounter server 141a. The encounter server 141a searches 805 its stored messages 812a to determine if there are any messages indicating the same application type as editor 131a, or alternatively, application name, for a more limited task proximity function. If a status message is found with the same application type/name, the encounter server 141a invokes 821 the match object 133a to determine whether the position of the worker associated with the located status message is the same as worker A's position, position X. The encounter server 141a passes in the position of the other worker as taken from the found status message.

In this case, the encounter server 141a finds a status message (previously received) indicating that worker B is also using an editor, editor 131b, but with data file Y, and hence at position Y. Again, the editors may have the same name, or the same type. The match object 133a has access to the current position of worker A, position X, since it is associated with editor 131a. The match object 131a determines that position X and position Y are not the same, and returns 823 a task proximity flag so indicating. Thus, worker B does not appear at this point in encounter window 143a, nor does worker A appear in encounter window 143b.

The encounter server 141a sends 813a status message indicating worker A's current position. Again, this status message includes a handle to worker A's person object 137a, the identification number of worker's computer, a timestamp, the name of editor 141a, and position X. Encounter server 131b receives this message, and replaces 819 the previous status message for worker A with the current one. Since the previous position for worker A was null, there is no need to update the encounter window 143a.

The encounter server 141b compares the new status message, and the application type/name specified therein, with the current application type/name, here editor 131b. These match, and the encounter server 141b invokes 825 the match object 133b associated with the editor 131b, passing in position X from the received status message. The match object 133b compares the positions, position X and position Y, and determines that there is no match, and so informs the encounter server 141b. Accordingly, there is no need to update worker B's encounter window 143b.

Worker A now loads 827 data file Y. Again, the editor 131a informs 803 its encounter proxy object 135a of the new position, position Y, and the encounter proxy object 135a sends 807 a status message with the position information to the encounter server 141a. When the encounter server 141a searches 805 its stored messages, the encounter server 141a identifies a message indicating that worker B also is using an editor 131. The encounter server 141a invokes 821 the match object 133a, which determines that position Y of worker B matches position Y of worker A, returning 823 a task proximity flag to this effect. The encounter server 141a sends 811 a message with a handle to worker B's person object client and representation (icon or the like) to its encounter window 143a, which then displays the representation. Worker A can now see that worker B is task proximate to her. The timestamp included in the status message may be used by the encounter window 143a to order the appearance of the representations of worker B and others.

The encounter server 141a also sends 813 the status message with worker A's current position Y to other encounter servers 141. The encounter server 141b receives this message, compares 815 it to previous stored messages, and passes 825 the message to the match object 133b along with the position from the previous status message specifying worker B's position. This match object 133b also matches the positions of workers A and B as being task proximate. The encounter server 141b sends 817 a message to the encounter window 143b with the handle to worker A's person object client 137a and icon, and worker B's encounter window 143b updates itself with the representation of worker A.

If worker A desires to interact with worker B, worker A can initiate a video conference or other communication mechanism using one of the buttons on the encounter window 143 or business card of worker B. The encounter server 141a stores, in the status messages, the object reference to worker B and machine identification number of worker B's computer. When requested, the server 141a will use these values to connect to a communication service on worker B's computer.

If a user places their encounter window 143 in the closed mode, their encounter server 141 continues to receive 813 and store status messages. This allows the encounter server 141 to maintain the current state of the mechanism, and thereby update the encounter window 143 if and when the user places their encounter window 143 in the minimal or open mode. In addition, when placed in closed mode, the encounter server 143 sends out a status message with a null position for the user, so that the user is no longer task proximate to any other users. Accordingly, the encounter windows 143 of other users will be updated.

Where the user places the encounter window 143 in the minimal mode, encounter server 141 adds a flag to the status messages it sends out indicating the minimal mode for the worker. When other encounter servers 141 receive this flag in a status message, each encounter server 141 informs its associated encounter window 143 of this flag for a particular user. Each encounter window 143 then updates its display with a suitable representation of the minimal mode, such as the silhouette 42.

Referring again to FIG. 7, in the preferred embodiment, person objects 137 are formed in two parts: a lightweight client component, and a more heavyweight server component. The client component provides an address to the server component, and various operations to optimize performance, such as caching the user's representation to reduce the time required to update the encounter window 143, and to connect to the communication services. Pasting the person object 137 generally consists in pasting the address of the server component.

Person object clients are communicated between users, encounter-aware applications, and the encounter windows 143. When a person object client is asked for a value, for example a name, the client accesses the person object 137 server which then returns the value to the client, which in turn forwards it the requesting object. Thus, when the encounter window 143 is updating itself, it will obtain the data for the representation from the server component of the person object 137 if there is not already a representation available in the local person object 137 client. In a preferred implementation person object 137 clients can cache immutable (or very rarely changing) values, for example, the user name, or iconic representation. Other information that depends on executing processes or behaviors are not cached, such as status flag or current activity level. Person object 137 clients preferably provide only read operations to other objects, and do not allow such objects to update the values. The person object 137 server is controlled by the worker whom it represents, and this person is allowed to update values in the server through a suitable interface.

The above description is illustrative and not restrictive. Many variations of the invention will be apparent to those of skill in the art upon review of this disclosure. The scope of the invention should, therefore, be determined with reference to the appended claims, along with their full scope of equivalents, and not merely with reference to the above description.

We claim:

1. A computer system for a plurality of users and providing to a first user a visual representation of selected second users who are task proximate to the first user, comprising:

a plurality of computers, each computer having a plurality of executable applications;

one of the plurality of computers being a first computer of a first user, the first computer having a first application accessing a first datum;

each of the remaining plurality of computers being a second computer of a second user, each second computer having a second application accessing a second datum;

the first computer having a first user interface display displaying, for any of a plurality of second applications, visual representations of selected second users who are task proximate to the first user, where each selected second user is individually determined to be task proximate to the first user according to a first relationship between the first datum and a second datum; and the visual representation of each selected second user being periodically gradually, visually transformed from a first visual representation associated with a first level of availability of the selected second user into a second visual representation associated with a second level of availability of the selected second user.

2. The computer system of claim 1, wherein the first relationship between the first datum and the second datum comprises the first datum being the same as the second datum.

3. The computer system of claim 2, wherein the first relationship between the first datum and the second datum further comprises the first application accessing the first datum within a determined length of time from the second application accessing the second datum.

4. The computer system of claim 2, wherein the first relationship between the first datum and the second datum further comprises the first application accessing the first datum at a substantially same time that the second application accesses the second datum.

5. The computer system of claim 1, wherein each application has a type, each second user is further selected according to a second relationship between the type of the first application being used by the first user, and the type of a second application being used by the second user.

6. The computer system of claim 5, wherein the second relationship comprises the first application having a same application type as the second application.

7. The computer system of claim 1, wherein each second user is further selected according to the first application being used by the first user being the same as a second application being used by the second user.

8. The computer system of claim 1, wherein the first datum is a first data file and the second datum is a second data file.

9. The computer system of claim 8, wherein the first data file is stored in a first file directory, and the second data file is stored in a second file directory, the first relationship further comprises the first file directory being the same as the second file directory.

10. The computer system of claim 1, further comprising:

for each selected second user, the second computer of the second user having a second user interface display displaying a visual representation of the first user.

11. The computer system of claim 1 wherein:

each computer includes at least one functional component adapted to compare the datum associated with each of two users, and provide in response thereto a signal indicating whether the data has the first relationship.

12. The computer system of claim 11, wherein the functional component is further adapted to compare an application type of a first application with an application type of a second application, and provide in response thereto the signal indicating whether the first and second applications are of a same type.

13. The computer system of claim 1, wherein a visual representation of a second user is added to the first user interface display at substantially the same time as wehn the first user becomes task proximate to the second user according to the first relationship, and wherein a visual representation of a second user is removed from the user interface display at substantially the same time that the first user is determined to no longer be task proximate to the second user according to the first relationship.

14. The computer system of claim 13, wherein the addition or removal of the visual representation of the second user is provided by a gradual visual transformation.

15. A computer system for a plurality of users and providing to a first user a visual representation of selected second users, comprising:

a plurality of computers, each computer having a plurality of executable applications, each application having a type;

one of the plurality of computers being a first computer of a first user, the first computer having a first application accessing a first datum at a first time;

each of the remaining plurality of computers being a second computer of a second user, each second computer having a second application accessing a second datum at a second time;

the first computer having a first user interface display displaying, for any of a plurality of second applications and any second datum, visual representations of selected second users who are task proximate to the first user, where each selected second user is individually determined to be task proximate to the first user according to at least one relationship from a group comprising:

a first relationship between the first datum and the second datum;

a second relationship between a type of the first application and a type of the second application; and, a third relationship between the first time and the second time; and the visual representation of each selected second user being periodically gradually, visually transformed from a first visual representation associated with a first level of availability of the selected second user into a second visual representation associated with a second level of availability of the selected second user.

16. The first user interface display of claim 15, wherein a visual representation of a second user is added to the first user interface display at substantially the same time as when the first user is determined to be task proximate to the second user.

17. The first user interface display of claim 16, wherein a visual representation of a second user is removed from the user interface display at substantially the same time that the first user is determined to no longer be task proximate to the second user.

18. The first user interface of claim 17, wherein the addition or removal of the visual representation of the second user is provided by a gradual visual transformation.

19. The computer system of claim 15, further comprising:

a second computer of a second user, the second computer having a user interface display including a visual representation of the first user at any time that the first user interface display displays a visual representation of the second user.

20. The computer system of claim 15, wherein a first user is task proximate to a second user where in the first relationship:
the first datum is the same as the second datum.

21. The computer system of claim 15, wherein a first user is task proximate to a second user where in the second relationship:
the type of the first application is the same as the type of the second application.

22. The computer system of claim 15, wherein a first user is task proximate to a second user where in the third relationship:
the first time at which the first user uses the first application is within a predetermined length of time to a second time the second user uses the second application.

23. The computer system of claim 15, wherein the user interface display includes a first mode of operation that provides a first visual representation for all second users who are task proximate to the first user, and a second visual representation when no other users are task proximate to the first user.

24. The computer system of claim 23, wherein:
the user interface display of the first computer further includes a second mode of operation that provides only a visual representation of whether or not at least one second user is task proximate to the first user; and,
the user interface-display of each second computer displays a visual representation of the first user indicating that the user interface display of the first computer is in the second mode of operation.

25. The computer system of claim 23, wherein:
the user interface display of the first computer further includes a third mode of operation that provides no visual representations of any task proximate users; and,
the user interface display of the second computer does not display a visual representation of the first user regardless of whether the first user is task proximate to any second user.

26. The computer system of claim 15, further comprising:
a second computer of a second user, the second computer having a user interface display including a visual representation of the first user where the first user is task proximate to the second user, and the visual representation of the first user is a function of a display mode of the user interface display of the first computer.

27. The computer system of claim 15, further comprising a communication mechanism allowing the first user to initiate a communication to a second user represented by a visual representation in the user interface display.

28. The user interface of claim 15, wherein there is provided a first aural indication each time a second user becomes task proximate to the first user.

29. The user interface of claim 28, wherein there is provided a second aural indication each time a second user becomes no longer task proximate to the first user.

30. The user interface of claim 15, wherein there is a provided a mode of operation allowing the first user to search for at least one second user by at least one search key.

31. The computer system of claim 15, wherein each computer further comprises:
at least one application capable of providing a message specifying a position including a datum that a user is accessing at a selected time, the message provided by an active application at about the time the user changes their position; and,
at least one match object that compares a first position of a first user and a second position of a second user, and provides a signal indicating whether the first and second users are task proximate to each other, where the first position includes the first datum, the first application, and the first time, and the second position includes the second datum, the second application, and the second time.

32. The computer system of claim 31, further comprising:
a plurality of person objects, each person object uniquely associated with a user of the computer system, each person object having a visual representation capable of being displayed in the user interface displays.

33. The computer system of claim 31, further comprising on each computer:
a server application that receives the messages from the active application and provides the messages to a selected match object, the selected match object providing to the server the signal, the server application providing the signal to the user interface display.

34. The computer system of the 31, wherein for selected applications there is a match object associated each selected application, each such match object comparing a position of a user of the application with a position of another user specified in a received message.

35. The computer system of claim 31, wherein there is a plurality of match objects available to a server application, the server application selecting a match object according to a type of the active application on the computer having the server.

36. In a computer system for multiple users, where each user has a display device having an interface display, a computer implemented method of providing an awareness of a second user who is task proximate to a first user, comprising:
determining a first task performed by a first user in a first application that the first user is using;
determining a second task performed by a second user in any of a plurality of second applications that the second user is using;
determining whether the first task is task proximate to the second task;
responsive to the first task being task proximate to the second task, displaying for each user a visual representation of the other user in the interface display associated with each user; and
for each user, periodically gradually visually transforming the visual representation of the other user from a first visual representation associated with a first level of availability of the other user into a second visual representation associated with a second level of availability of the other user.

37. The computer implemented method of claim 36, further comprising: determining for each user an active application of the user.

38. The computer implemented method of claim 36, wherein determining whether the first position is task proximate to the second position further comprises at least one of a group of comparisons including:
comparing a first datum specified in the first position with a second datum specified in the second position;
comparing a first application specified in the first position with a second application identified in the second position;
comparing a type of a first application specified in the first position with a type of a second application identified in the second position; and, comparing a first time specified in the first position to a second time specified in the second position.

39. The computer implemented method of claim 38, wherein comparing a first time specified in the first position to a second time specified in the second position further comprises:

determining whether the first time is within a predetermined length of time to the second time.

40. The computer implemented method of claim 38 wherein comparing a first datum specified in the first position with a second datum specified in the second position further comprises:

determining whether the first datum is identical to the second datum.

41. The computer implemented method of claim 38, where the first datum and second datum are members of at least one hierarchical structure, wherein comparing a first datum specified in the first position with a second datum specified in the second position further comprises:

determining whether the first datum is hierarchically related to the second datum within a predetermined number of hierarchical levels.

42. The computer implemented method of claim 38, where the first datum and second datum are data files, wherein comparing a first datum specified in the first position with a second datum specified in the second position further comprises:

determining whether the first data file is the same as the second data file.

43. The computer implemented method of claim 38, where the first datum and second datum are data files in at least one directory structure, wherein comparing a first datum specified in the first position with a second datum specified in the second position further comprises:

determining whether the first data file is in a same directory level as the second data file.

44. The method of claim 36 further comprising:

responsive to a change in the position of the first user such that the position of the first user is no longer task proximate to the position of the second user, removing the visual representation of the first user from the interface display of the second user, and removing the visual representation of the second user from the interface display associated with the first user.

45. The method of claim 44, wherein the display or removal of the visual representation of the second user is provided by a gradual visual transformation.

46. In a computer system for multiple users, a computer readable memory accessable by a first computer of a first user, the first computer having a processor and a display device, the memory storing at least one computer program executable by the processor that provides an awareness to the first user of a second user who is task proximate to a first user, the computer program controlling the processor to:

determine a first task performed by a first user in a first application executing on the processor;

receive a signal indicating a second task performed by a second user in any of a plurality of second applications that the second user is using;

determine whether the first task is task proximate to the second task;

responsive to the first task being task proximate to the second task, display a visual representation of the second user in the interface display associated with the computer of the first user; and periodically gradually visually transforming the visual representation of the second user from a first visual representation associated with a first level of availability of the second user into a second visual representation associated with a second level of availability of the second user.

47. The memory of claim 46, wherein the computer program stored thereon, in determining whether the first position is task proximate to the second position, further compares at least one of:

a first datum specified in the first position with a second datum specified in the second position;

a first application specified in the first position with a second application identified in the second position;

a type of a first application specified in the first position with a type of a second application identified in the second position; and, a first time, specified in the first position, at which the first user uses the first application, with a second time, specified in the second position, at which the second user uses the second application.

48. The memory of claim 47, wherein the computer program stored thereon, in comparing a first datum specified in the first position with a second datum specified in the second position further determines whether the first datum is the same as the second datum.

49. The memory of claim 47, where the first datum and second datum are members of at least one hierarchical structure, wherein the computer program stored thereon, in comparing a first datum specified in the first position with a second datum specified in the second position further determines whether the first datum is hierarchically related to the second datum within a predetermined number of hierarchical levels.

50. The memory of claim 47, wherein the computer program stored thereon, in comparing a first time specified in the first position with a second time specified in the second position further determines whether the first time is within a predetermined length of time to the second time.

51. The memory of claim 47, wherein the computer program, in comparing the type of the first application with the type of the second application determines whether the type of the first application is the same as the type of the second application.

52. The memory of claim 46, wherein the computer program stored on the memory:

displays a visual representation of a second user at substantially the same time as when the first user is determined to be task proximate to the second user.

\* \* \* \* \*